(12) United States Patent
Boulanger

(10) Patent No.: US 9,176,538 B2
(45) Date of Patent: Nov. 3, 2015

(54) INPUT DEVICE CONFIGURATIONS

(71) Applicant: Microsoft Corporation, Redmond, WA (US)

(72) Inventor: Catherine N. Boulanger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/759,875

(22) Filed: Feb. 5, 2013

(65) Prior Publication Data

US 2014/0221098 A1  Aug. 7, 2014

(51) Int. Cl.
*G06F 1/16* (2006.01)
*A63F 13/90* (2014.01)

(52) U.S. Cl.
CPC .............. *G06F 1/1684* (2013.01); *A63F 13/08* (2013.01); *G06F 1/1632* (2013.01); *G06F 1/1626* (2013.01); *G06F 2200/1633* (2013.01); *G06F 2200/1634* (2013.01)

(58) Field of Classification Search
CPC ..... B65D 85/00; G06F 1/1616; G06F 1/1684; G06F 1/1632; G06F 2200/1634; G06F 2200/1633; G06F 1/1626; A63F 13/08
USPC ................... 206/320; 361/679.09; 463/37, 47
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,243,861 A | 1/1981 | Strandwitz | |
| 4,279,021 A | 7/1981 | See et al. | |
| 4,302,648 A | 11/1981 | Sado et al. | |
| 4,317,013 A | 2/1982 | Larson | |
| 4,326,193 A | 4/1982 | Markley et al. | |
| 4,365,130 A | 12/1982 | Christensen | |

(Continued)

FOREIGN PATENT DOCUMENTS

| | | |
|---|---|---|
| EP | 1223722 | 7/2002 |
| EP | 1591891 | 11/2005 |

(Continued)

OTHER PUBLICATIONS

"Non-Final Office Action", U.S. Appl. No. 13/527,263, (Jul. 19, 2013), 5 pages.

(Continued)

*Primary Examiner* — Paul A D'Agostino
*Assistant Examiner* — Carl V Larsen
(74) *Attorney, Agent, or Firm* — Jeremy Snodgrass; Judy Yee; Micky Minhas

(57) ABSTRACT

Input device configurations are described. In one or more implementations, an input device includes a connection portion, protective case, and one or more controls. The connection portion is configured to provide a removable physical connection to a computing device. The protective case is coupled to the connection portion and configured to support rotational movement of the protective case in relation to the computing device when the connection portion is physically connected to the computing device. The one or more controls are disposed on the protective case such that at least one control is accessible to a user when the protective case is positioned behind the computing device and the computing device and the input device are grasped by one or more hands of a user.

20 Claims, 8 Drawing Sheets

(56) References Cited

U.S. PATENT DOCUMENTS

| | | |
|---|---|---|
| 4,492,829 A | 1/1985 | Rodrique |
| 4,527,021 A | 7/1985 | Morikawa et al. |
| 4,559,426 A | 12/1985 | Van Zeeland et al. |
| 4,588,187 A | 5/1986 | Dell |
| 4,607,147 A | 8/1986 | Ono et al. |
| 4,651,133 A | 3/1987 | Ganesan et al. |
| 5,220,521 A | 6/1993 | Kikinis |
| 5,283,559 A | 2/1994 | Kalendra et al. |
| 5,331,443 A | 7/1994 | Stanisci |
| 5,510,783 A | 4/1996 | Findlater et al. |
| 5,548,477 A | 8/1996 | Kumar et al. |
| 5,558,577 A | 9/1996 | Kato |
| 5,576,981 A | 11/1996 | Parker et al. |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,874,697 A | 2/1999 | Selker et al. |
| 5,909,211 A | 6/1999 | Combs et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,178,443 B1 | 1/2001 | Lin |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,774,888 B1 | 8/2004 | Genduso |
| 6,776,546 B2 | 8/2004 | Kraus et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,091,436 B2 | 8/2006 | Serban |
| 7,091,955 B2 | 8/2006 | Kramer |
| 7,106,222 B2 | 9/2006 | Ward et al. |
| 7,123,292 B1 | 10/2006 | Seeger et al. |
| 7,194,662 B2 | 3/2007 | Do et al. |
| 7,202,837 B2 | 4/2007 | Ihara |
| 7,213,991 B2 | 5/2007 | Chapman et al. |
| 7,277,087 B2 | 10/2007 | Hill et al. |
| 7,423,557 B2 | 9/2008 | Kang |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| 7,622,907 B2 | 11/2009 | Vranish |
| 7,636,921 B2 | 12/2009 | Louie |
| 7,639,876 B2 | 12/2009 | Clary et al. |
| 7,656,392 B2 | 2/2010 | Bolender |
| 7,686,694 B2 | 3/2010 | Cole |
| 7,733,326 B1 | 6/2010 | Adiseshan |
| 7,777,972 B1 | 8/2010 | Chen et al. |
| 7,782,342 B2 | 8/2010 | Koh |
| 7,813,715 B2 | 10/2010 | McKillop et al. |
| 7,865,639 B2 | 1/2011 | McCoy et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,945,717 B2 | 5/2011 | Rivalsi |
| 7,973,771 B2 | 7/2011 | Geaghan |
| 7,976,393 B2 | 7/2011 | Haga et al. |
| 7,978,281 B2 | 7/2011 | Vergith et al. |
| 8,053,688 B2 | 11/2011 | Conzola et al. |
| 8,065,624 B2 | 11/2011 | Morin et al. |
| 8,069,356 B2 | 11/2011 | Rathi et al. |
| 8,090,885 B2 | 1/2012 | Callaghan et al. |
| 8,117,362 B2 | 2/2012 | Rodriguez et al. |
| 8,118,681 B2 | 2/2012 | Mattice et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,216,074 B2 | 7/2012 | Sakuma |
| 8,229,509 B2 | 7/2012 | Paek et al. |
| 8,229,522 B2 | 7/2012 | Kim et al. |
| 8,269,093 B2 | 9/2012 | Naik et al. |
| D696,253 S * | 12/2013 | Akana et al. ............... D14/345 |
| D704,702 S * | 5/2014 | Akana et al. ............... D14/341 |
| 8,757,374 B1 * | 6/2014 | Kaiser ............................ 206/320 |
| 9,098,304 B2 | 8/2015 | Young, Robert D. et al. |
| 2001/0035859 A1 | 11/2001 | Kiser |
| 2002/0000977 A1 | 1/2002 | Vranish |
| 2002/0126445 A1 | 9/2002 | Minaguchi et al. |
| 2002/0134828 A1 | 9/2002 | Sandbach et al. |
| 2002/0154099 A1 | 10/2002 | Oh |
| 2002/0188721 A1 | 12/2002 | Lemel et al. |
| 2003/0044215 A1 | 3/2003 | Monney et al. |
| 2003/0132916 A1 | 7/2003 | Kramer |
| 2003/0197687 A1 | 10/2003 | Shetter |
| 2004/0005184 A1 | 1/2004 | Kim et al. |
| 2004/0174670 A1 | 9/2004 | Huang et al. |
| 2004/0190239 A1 | 9/2004 | Weng et al. |
| 2004/0212598 A1 | 10/2004 | Kraus et al. |
| 2004/0258924 A1 | 12/2004 | Berger et al. |
| 2004/0268000 A1 | 12/2004 | Barker et al. |
| 2005/0057515 A1 | 3/2005 | Bathiche |
| 2005/0057521 A1 | 3/2005 | Aull et al. |
| 2005/0059489 A1 | 3/2005 | Kim |
| 2005/0146512 A1 | 7/2005 | Hill et al. |
| 2005/0190159 A1 | 9/2005 | Skarine |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0103633 A1 | 5/2006 | Gioeli |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0195522 A1 | 8/2006 | Miyazaki |
| 2006/0238510 A1 | 10/2006 | Panotopoulos et al. |
| 2006/0248597 A1 | 11/2006 | Keneman |
| 2007/0051792 A1 | 3/2007 | Wheeler et al. |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0234420 A1 | 10/2007 | Novotney et al. |
| 2007/0236408 A1 | 10/2007 | Yamaguchi et al. |
| 2007/0247338 A1 | 10/2007 | Marchetto |
| 2007/0247432 A1 | 10/2007 | Oakley |
| 2007/0257821 A1 | 11/2007 | Son et al. |

(56) References Cited

U.S. PATENT DOCUMENTS

| | | |
|---|---|---|
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0018611 A1 | 1/2008 | Serban et al. |
| 2008/0104437 A1 | 5/2008 | Lee |
| 2008/0151478 A1 | 6/2008 | Chern |
| 2008/0158185 A1 | 7/2008 | Westerman |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073957 A1 | 3/2009 | Newland et al. |
| 2009/0117955 A1* | 5/2009 | Lo .......................... 455/575.3 |
| 2009/0135142 A1 | 5/2009 | Fu et al. |
| 2009/0140985 A1 | 6/2009 | Liu |
| 2009/0182901 A1 | 7/2009 | Callaghan et al. |
| 2009/0219250 A1 | 9/2009 | Ure |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0085321 A1 | 4/2010 | Pundsack |
| 2010/0103112 A1 | 4/2010 | Yoo et al. |
| 2010/0103131 A1 | 4/2010 | Segal et al. |
| 2010/0141588 A1* | 6/2010 | Kimura et al. ................ 345/169 |
| 2010/0148642 A1* | 6/2010 | Eromaki et al. ........... 312/223.1 |
| 2010/0149111 A1 | 6/2010 | Olien |
| 2010/0161522 A1 | 6/2010 | Tirpak et al. |
| 2010/0162109 A1 | 6/2010 | Chatterjee et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0238119 A1 | 9/2010 | Dubrovsky et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321301 A1 | 12/2010 | Casparian et al. |
| 2010/0325155 A1 | 12/2010 | Skinner et al. |
| 2011/0007008 A1 | 1/2011 | Algreatly |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043990 A1 | 2/2011 | Mickey et al. |
| 2011/0050587 A1 | 3/2011 | Natanzon et al. |
| 2011/0057899 A1 | 3/2011 | Sleeman et al. |
| 2011/0059771 A1* | 3/2011 | Kondo ...................... 455/556.2 |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0095994 A1 | 4/2011 | Birnbaum |
| 2011/0096513 A1* | 4/2011 | Kim ............................ 361/747 |
| 2011/0102326 A1 | 5/2011 | Casparian et al. |
| 2011/0118025 A1 | 5/2011 | Lukas et al. |
| 2011/0134032 A1 | 6/2011 | Chiu et al. |
| 2011/0147398 A1* | 6/2011 | Ahee et al. ..................... 220/810 |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0222238 A1* | 9/2011 | Staats et al. ............. 361/679.55 |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0248920 A1 | 10/2011 | Larsen |
| 2011/0267300 A1 | 11/2011 | Serban et al. |
| 2011/0267757 A1* | 11/2011 | Probst et al. ............. 361/679.09 |
| 2011/0290686 A1 | 12/2011 | Huang |
| 2011/0297566 A1 | 12/2011 | Gallagher et al. |
| 2011/0304577 A1 | 12/2011 | Brown |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068933 A1 | 3/2012 | Larsen |
| 2012/0072167 A1 | 3/2012 | Cretella, Jr. et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099263 A1 | 4/2012 | Lin |
| 2012/0099749 A1 | 4/2012 | Rubin et al. |
| 2012/0106078 A1* | 5/2012 | Probst et al. ............. 361/679.56 |
| 2012/0106082 A1 | 5/2012 | Wu et al. |
| 2012/0117409 A1 | 5/2012 | Lee et al. |
| 2012/0127118 A1 | 5/2012 | Nolting et al. |
| 2012/0127646 A1* | 5/2012 | Moscovitch ............. 361/679.09 |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0194448 A1 | 8/2012 | Rothkopf |
| 2012/0224073 A1 | 9/2012 | Miyahara |
| 2012/0235921 A1 | 9/2012 | Laubach |
| 2012/0246377 A1 | 9/2012 | Bhesania |
| 2012/0256959 A1 | 10/2012 | Ye et al. |
| 2012/0268911 A1* | 10/2012 | Lin ............................... 361/807 |
| 2012/0274811 A1 | 11/2012 | Bakin |
| 2012/0287562 A1 | 11/2012 | Wu et al. |
| 2012/0300275 A1 | 11/2012 | Vilardell et al. |
| 2012/0328349 A1 | 12/2012 | Isaac et al. |
| 2013/0063873 A1 | 3/2013 | Wodrich et al. |
| 2013/0094131 A1* | 4/2013 | O'Donnell et al. ....... 361/679.02 |
| 2013/0118933 A1* | 5/2013 | Wang et al. .................... 206/320 |
| 2013/0278552 A1 | 10/2013 | Kamin-Lyndgaard |
| 2013/0304941 A1 | 11/2013 | Drasnin |
| 2013/0304944 A1 | 11/2013 | Young |
| 2013/0335330 A1 | 12/2013 | Lane |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0197058 A1* | 7/2014 | Huet et al. ..................... 206/320 |

FOREIGN PATENT DOCUMENTS

| | | |
|---|---|---|
| EP | 2353978 | 8/2011 |
| GB | 2178570 | 2/1987 |

(56) References Cited

FOREIGN PATENT DOCUMENTS

| | | |
|---|---|---|
| JP | 10326124 | 12/1998 |
| JP | 11345041 | 12/1999 |
| WO | WO-2012036717 | 3/2012 |

OTHER PUBLICATIONS

"Write & Learn Spellboard Advanced", Available at <http://somemanuals.com/VTECH,WRITE%2526LEARN--SPELLBOARD--ADV--71000,JIDFHE.PDF>, (2006), 22 pages.

Bathiche, Steven N., et al., "Input Device with Interchangeable Surface", U.S. Appl. No. 13/974,749, filed Aug. 23, 2013, 51 pages.

Lance, David M., et al., "Media Processing Input Device", U.S. Appl. No. 13/655,065, filed Oct. 18, 2012, 43 pages.

"International Search Report and Written Opinion", Application No. PCT/US2013/045283, Mar. 12, 2014, 19 pages.

"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.

"Non-Final Office Action", U.S. Appl. No. 13/527,263, Apr. 3, 2014, 6 pages.

"Non-Final Office Action", U.S. Appl. No. 13/655,065, Apr. 24, 2014, 16 pages.

"Non-Final Office Action", U.S. Appl. No. 13/974,994, Jun. 4, 2014, 24 pages.

"Non-Final Office Action", U.S. Appl. No. 13/975,087, May 8, 2014, 18 pages.

Staff, "Gametel Android controller turns tablets, phones into portable gaming devices", Retrieved at <<http://www.mobiletor.com/2011/11/18/gametel-android-controller-turns-tablets-phones-into-portable-gaming-devices/#>>, Nov. 18, 2011, pp. 5.

"MOGA gaming controller enhances the Android gaming experience", Retrieved at <<http://www.zdnet.com/moga-gaming-controller-enhances-the-android-gaming-experience-7000007550/>>, Nov. 18, 2012, pp. 9.

"iControlPad 2—The open source controller", Retrieved at <<http://www.kickstarter.com/projects/1703567677/icontrolpad-2-the-open-source-controller>>, Retrieved Date: Nov. 20, 2012, pp. 15.

"Accessing Device Sensors", retrieved from <https://developer.palm.com/content/api/dev-guide/pdk/accessing-device-sensors.html>on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012,10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013),1 page.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", Interlink Electronics, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"i-Interactor electronic pen", Retrieved from: <http://www.alibaba.com/product-gs/331004878/i_Interactor_electronic_pen.html> on Jun. 19, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", Android Developers, retrieved from <http://developer.android.com/guide/topics/sensors/sensors_motion.html> on May 25, 2012, 7 pages.

"MPC Fly Music Production Controller", AKAI Professional, Retrieved from: <http://www.akaiprompc.com/mpc-fly> on Jul. 9, 2012,4 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action", U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

"Non-Final Office Action", U.S. Appl. No. 13/651,272, (Feb. 12, 2013),10 pages.

"Non-Final Office Action", U.S. Appl. No. 13/651,287, (Jan. 29, 2013),13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013),14 pages.

"Non-Final Office Action", U.S. Appl. No. 13/651,976, (Feb. 22, 2013),16 pages.

"Non-Final Office Action", U.S. Appl. No. 13/653,321, (Feb. 1, 2013),13 pages.

"Non-Final Office Action", U.S. Appl. No. 13/653,682, (Feb. 7, 2013),11 pages.

"Notice of Allowance", U.S. Appl. No. 13/470,633, (Mar. 22, 2013), 7 pages.

"Position Sensors", Android Developers, retrieved from <http://developer.android.com/guide/topics/sensors/sensors_position.html> on May 25, 2012, 5 pages.

"Reflex LCD Writing Tablets", retrieved from <http://www.kentdisplays.com/products/lcdwritingtablets.html> Jun. 27, 2012, 3 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013) 6 pages.

"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008),11 Pages.

"Virtualization Getting Started Guide", Red Hat Enterprise Linux 6, Edition 0.2, retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

(56) References Cited

OTHER PUBLICATIONS

Block, Steve et al., "DeviceOrientation Event Specification", *W3C, Editors Draft*, retrieved from <https://developer.palm.com/content/api/dev-guide/pdk/accessing-device-sensors.html> on May 25, 2012,(Jul. 12, 2011),14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Dietz, Paul H., et al., "A Practical Pressure Sensitive Computer Keyboard", In Proceedings of UIST 2009,(Oct. 2009), 4 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/> on May 7, 2012,(Jan. 15, 2006), 5 pages.

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices By Ultrasonic Hot Embossing on Thin Polymer Films", IEEE Transactions on Electronics Packaging Manufacturing, vol. 32, No. 3,(Jul. 2009), pp. 152-156.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.

Post, E.R. et al., "E-Broidery: Design and Fabrication of Textile-Based Computing", IBM Systems Journal, vol. 39, Issue 3 & 4,(Jul. 2000), pp. 840-860.

Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.

Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.

Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.

Takamatsu, Seiichi et al., "Flexible Fabric Keyboard with Conductive Polymer-Coated Fibers", In Proceedings of Sensors 2011,(Oct. 28, 2011), 4 pages.

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.

"Non-Final Office Action", U.S. Appl. No. 13/645,405, Jan. 31, 2014, 6 pages.

"International Search Report and Written Opinion", Application No. PCT/US2013/044873, Nov. 22, 2013, 9 pages.

"Advanced Configuration and Power Management Specification", Intel Corporation, Microsoft Corporation, Toshiba Corp. Revision 1, (Dec. 22, 1996), 364 pages.

"International Search Report and Written Opinion", Application No. PCT/US2013/040968, (Sep. 5, 2013),12 pages.

"Final Office Action", U.S. Appl. No. 13/655,065, Aug. 8, 2014, 20 pages.

"Final Office Action", U.S. Appl. No. 13/974,994, Oct. 6, 2014, 26 pages.

"Final Office Action", U.S. Appl. No. 13/975,087, Sep. 10, 2014, 19 pages.

"International Search Report and Written Opinion", Application No. PCT/US2014/014522, Jun. 6, 2014, 13 pages.

"Non-Final Office Action", U.S. Appl. No. 13/645,405, Aug. 11, 2014, 5 pages.

"Final Office Action", U.S. Appl. No. 13/655,065, Apr. 2, 2015, 23 pages.

"Final Office Action", U.S. Appl. No. 13/974,994, Jun. 10, 2015, 28 pages.

"Notice of Allowance", U.S. Appl. No. 13/645,405, Mar. 26, 2015, 6 pages.

"Final Office Action", U.S. Appl. No. 13/527,263, Jan. 27, 2015, 7 pages.

"Non-Final Office Action", U.S. Appl. No. 13/655,065, Dec. 19, 2014, 24 pages.

"Non-Final Office Action", U.S. Appl. No. 13/974,994, Jan. 23, 2015, 26 pages.

"Non-Final Office Action", U.S. Appl. No. 13/975,087, Feb. 27, 2015, 20 pages.

"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.

"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.

"Corrected Notice of Allowance", U.S. Appl. No. 13/645,405, Jul. 7, 2015, 2 pages.

"Final Office Action", U.S. Appl. No. 13/975,087, Aug. 7, 2015, 16 pages.

"Non-Final Office Action", U.S. Appl. No. 13/655,065, Aug. 19, 2015, 18 pages.

\* cited by examiner

1000 ⟶

1002
Rotate an input device to assume a first position in relation to a computing device, the input device removable connected to the computing device using magnetism, the first position causing a protection portion of the input device to substantially cover a display device of the computing device

1004
Rotate the input device to assume a second position in relation to the computing device, the second position causing the protection portion to be disposed at a rear of a housing of the computing device that is opposite to the display device and exposure of at least one control that is configured to provide one or more inputs to the computing device

*Fig. 10*

INPUT DEVICE CONFIGURATIONS

BACKGROUND

The variety of configurations of computing devices is ever increasing. For example, computing devices may be found in an ever increasing variety of form factors, such as from traditional personal computers to game consoles and mobile communications devices such as tablets, smartphones, portable game devices, and so on.

Additionally, the functionality that is made available by each of these devices is also ever increasing. For example, productivity applications such as spreadsheets and word processors have expanded from traditional personal computers to tablets, gaming applications have expanded from dedicated game consoles to mobile computing devices, and so forth. However, these different uses may encounter complications when used on computing devices having configurations that were not originally designed for those uses.

SUMMARY

Input device configurations are described. In one or more implementations, an input device includes a connection portion, protective case, and one or more controls. The connection portion is configured to provide a removable physical connection to a computing device. The protective case is coupled to the connection portion and configured to support rotational movement of the protective case in relation to the computing device when the connection portion is physically connected to the computing device. The one or more controls are disposed on the protective case such that at least one control is accessible to a user when the protective case is positioned behind the computing device and the computing device and the input device are grasped by one or more hands of a user.

In one or more additional implementations, an apparatus includes a protective case configured to at least partially encompass a housing of a computing device. One or more controls are disposed on a surface of the protective case and configured to provide one or more inputs to the computing device. At least one of the controls is positioned to be accessible by a thumb of a user's hand when holding the protective case having the computing device disposed therein and positioned on a side of the protective case that corresponds to a display device of the computing device.

In one or more implementations, an input device is rotated to assume a first position in relation to a computing device, the input device removably connected to the computing device using magnetism, the first position causing a protection portion of the input device to substantially cover a display device of the computing device. The input device is also rotated to assume a second position in relation to the computing device, the second position causing the protection portion to be disposed at a rear of a housing of the computing device that is opposite to the display device and exposure of at least one control that is configured to provide one or more inputs to the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 10 depicts a procedure in an example implementation in which the input device assumes different positions relative to a computing device.

DETAILED DESCRIPTION

Overview

Figure 1:
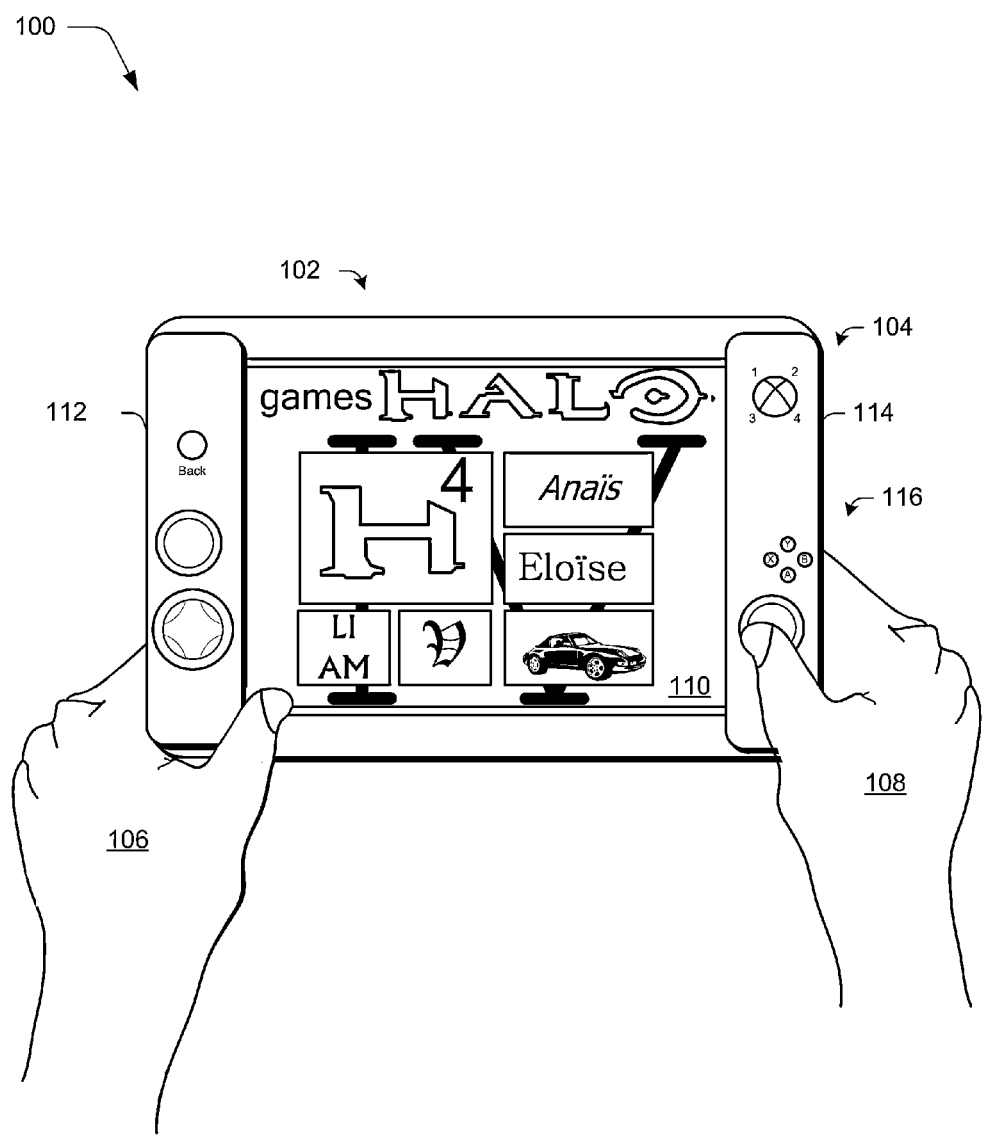
FIG. 1 is an illustration of an environment in an example implementation that is operable to employ the techniques described herein.

As previously described, computing devices may assume a variety of configurations and be employed for a variety of different uses. However, some of these configurations were conventionally less suited for some uses than other configurations. For example, conventional gaming devices employed dedicated hardware gaming controllers via which a user could interact with the game. These controllers typically included hardware configured to support intuitive interaction with a game. As games continued to expand to mobile communications devices such as tablets and mobile phones, however, limitations encountered through use of a touchscreen as the sole input device could limit a user's interaction with the games, especially when compared with dedicated devices.

Input device configurations are described. In one or more implementations, an input device is designed for use with a computing device such as mobile communications device having a slate form factor, e.g., a mobile phone, tablet, and so on. The input device may assume a variety of configurations to expand the functionality of the computing device.

For example, the input device may be configured as part of a protective cover for a mobile communications device that assumes a slate form factor, e.g., mobile phone, tablet, and so on. The protective cover may include one or more controls that are disposed on a surface of the protective cover to initiate functions of the computing device. Additionally, these controls may be arranged such that the controls are accessible while a user is grasping the device using one or more hands. In this way, a user may be provided with an expanded range of functionality for these device configurations.

The protective cover may be configured in a variety of ways. For instance, the protective cover may be configured as a shell that substantially encompasses the display device. In another example, the protective cover may be configured to be removably coupled to the computing device, such as through use of one or more magnets. Accordingly, the protective cover may be rotated to cover a display device of the computing device or be rotated for positioning at a rear of the computing device, such as to enable a user to view the display device.

When positioned at the rear of the computing device, the protective cover may be configured such that one or more controls are made available for interaction with the computing device. Continuing with the previous example, a user may grasp the computing device and operate the controls positioned at a front of the protective cover using their thumbs, controls positioned at the rear of the protective cover using their fingers, and so on. In this way, a user may grasp and hold the device and yet have access to controls that may be utilized to interact with the device, such as controls to interact with a game. A variety of other configurations are also contemplated, including configurations that do not involve games, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the techniques described herein. The illustrated environment 100 includes an example of a computing device 102 having an input device 104 that is communicatively and physically attached to the computing device 102.

The computing device 102 may be configured in a variety of ways. For example, the computing device 102 may be configured for mobile use (e.g., handheld), such as in a slate configuration. Examples of slate configurations may be found in mobile phones, a tablet computer as illustrated, portable game devices, music players, and so on. Thus, the computing device 102 may range from full resource devices with substantial memory and processor resources to a low-resource device with limited memory and/or processing resources.

The computing device 102 and the input device 104 are illustrated as being grasped in the hands 106, 108 of a user. Thus, as illustrated the thumbs of the user's hands 106, 108 are positioned to interact with a front surface of the input device 104 and computing device 102 that includes a display device 110 of the computing device 102. The display device 110, for instance, may include touchscreen functionality that is configured to detect proximity of an object (e.g., one or more fingers of the user's hands 106, 108) to interact with a user interface displayed by the display device 110.

The input device 104 may also be configured to support interaction in this scenario. In the illustrated example, the input device 104 includes control portions 112, 114 that are configured to be disposed at a front of the computing device 102, e.g., to be viewable simultaneously with the display device 110. In the illustrated example, the control portions 112, 114 of the input device 104 include controls that are configured for interaction with the thumbs of the user's hands 106, 108 while grasping the computing device 102 and the input device 104. Other controls may also be included on a back of the input device 104 as further described in the below discussion. In one or more implementations, the controls 112, 114 may be configured to support feedback such as haptics.

The illustrated configuration shows a close proximity between the display device 110 of the computing device 102 and controls 116 of the input device 104. As previously stated, the display device 110 may also support touch functionality. Therefore, a user may interact with a user interface output by the display device 110 and controls 116 of the input device 104 in an efficient manner due to this close proximity.

In the illustrated example, the controls are configured for use in conjunction with a game. As such, the controls may be configured to mimic controls found on a game controller. Other configurations are also contemplated, however, as further described in relation to FIG. 9. The input device 104 may assume a variety of different configurations, an example of which is described as follows and shown in a corresponding figure.

Figure 2:
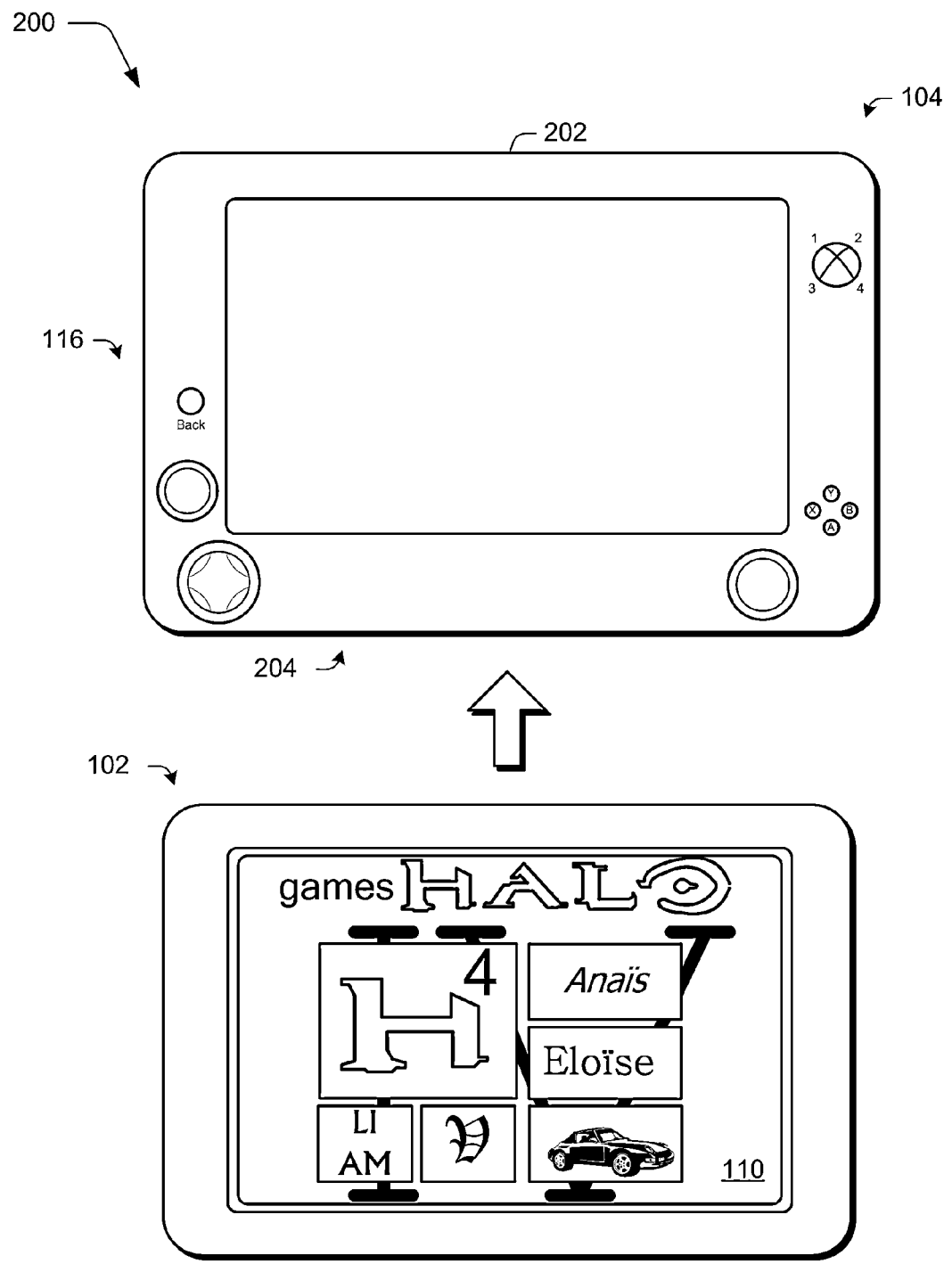
FIG. 2 depicts an example of a system in which an input device is configured as a shell.

FIG. 2 depicts an example of a system 200 in which the input device 104 is configured as a protective shell. The system 200 of FIG. 2 includes the computing device 102 that assumes a slate configuration as described in relation to FIG. 1. The input device 104 is configured as a protective case configured as a shell 202 that is configured to at least partially encompass a housing of the computing device 102. For example, the input device may be configured to cover a back, sides, and bezel of the computing device 102 and yet include an opening via which a user may view the display device 110 of the computing device 102.

The shell 202 may be configured in a variety of ways for assembly around the computing device 102. The shell 202, for instance, may include a slot 204 via which the computing device 102 is slid through. In another instance, the protective shell 202 may be configured to "snap together" from two or more separate parts around a housing of the computing device 102. A variety of other configurations are also contemplated, such as through configuration as part of a cover of the computing device 102, an example of which is described as follows and shown in a corresponding figure.

Figure 3:
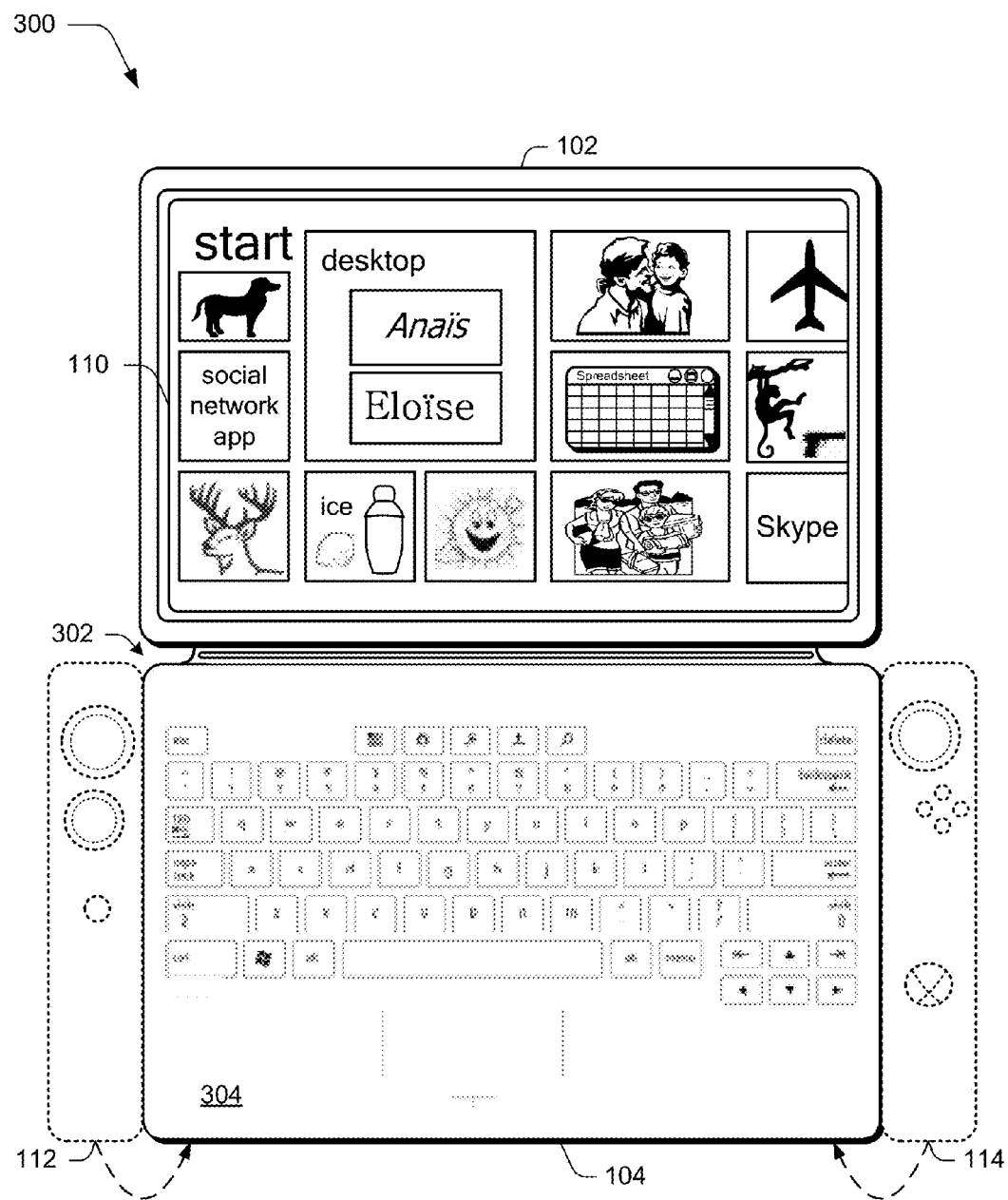
FIG. 3 depicts a system in an example implementation in which the input device is configured as a cover for use with the computing device.

FIG. 3 depicts a system 300 in an example implementation in which the input device 104 is configured as a cover for use with the computing device 102. The input device 104 in this example is removably attached to the computing device 102, which may be accomplished in a variety of ways as described in relation to FIG. 8. The input device 104 in this example includes a flexible hinge 302 via which the input device 104 and the computing device 102 may rotate in relation to each other.

The flexible hinge 302 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

This rotational movement may result in different orientations of the input device 104 in relation to the computing device 104. These different orientations may be detected using sensors of the computing device 104 and/or input device 104, such as accelerometers, magnetometers, inertial measurement units, gyroscopes, Hall Effect sensors, and so on. The detected orientations may then be used to change a state of the computing device 102 (e.g., applications executed by the device) and/or the input device 104.

Figure 4:
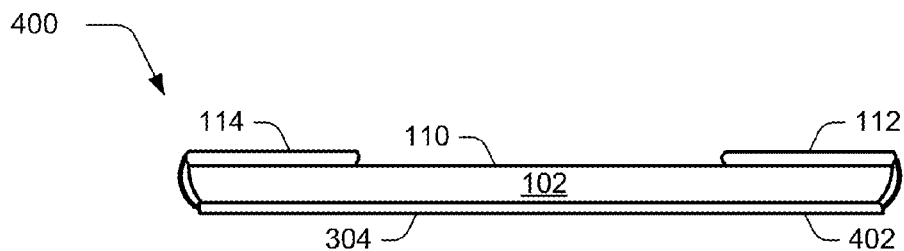
FIG. 4 depicts a top view of an example orientation of the input device in relation to the computing device as shown in FIG. 3.

Opening of the input device 104 from a closed orientation to an open orientation as shown in FIG. 4, for instance, may cause an application (e.g., game) to resume a previous state at which point at which the input device 104 and the computing device 102 were "closed." Closing of the input device 104 may further cause a history to be deleted or saved. In another example, resuming of the open configuration may cause the application and input device 104 to enter a play mode for output of media. For example, the play mode may cause reconfiguration of a user interface output on the display device (e.g., resizing) such that portions of the display device 110 covered by the control portions are not used to display the UI. The flexible hinge 106 may be configured to support this movement in a variety of ways, further discussion of which follows.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 may be configured in a variety of ways, further discussion of which may be found in relation to FIG. 8.

The input device 104 is illustrated as including an input portion 304. The input portion in this example includes a keyboard having a QWERTY arrangement of keys and track pad although other arrangements of keys are also contemplated. Thus, the input device 104 and keys incorporated by the input device 104 may assume a variety of different configurations to support a variety of different functionality. For example, the input device 104 may be configured to assume a form factor of a thickness of one millimeter or less, e.g., 0.65 millimeters. This may be performed in a variety of ways, such as through use of pressure sensitive switches that include a flexible contact layer having a force sensitive ink configured to contact shunts to initiate inputs. In another example, triggers may be employed that support a tactile experience (e.g., through a mechanical spring or foam) to provide tactile feedback, e.g., such as in an implementation employing a thickness of four millimeters or less. These techniques may be employed for the keys of the input device 104 and controls 116, including controls that may be disposed at a rear of the device as shown in FIG. 4.

The input device 104 is further illustrated as including control portions 112, 114 that are attached to the input portion 304 to support rotation movement, which are illustrated in phantom in this instance. The control portions 112, 114 include the controls 116 as previously described that are configured to initiate operations of the computing device 102, such as to provide interaction in a game or other application. The controls 116, for instance, may be configured to support pressure sensitivity, such as through use of force-sensitive inks and shunt geometries as described above.

Thus, in this example the input portion 304 of the input device 104 may be rotated behind the computing device, e.g., at a rear portion of the computing device 102 that opposes the display device 110. When in such a configuration, the control portions 112, 114 may each be rotated over a respective side of the housing of the computing device 102 to assume the configuration as shown in FIG. 1. Therefore, when in such a configuration the computing device 102 and the input device 104 may be grasped and supported by one or more hands 106, 108 of the user.

Further, the controls 116 of the input device 104 are accessible to the user for interaction with the computing device 102. In this way, a portable configuration may be supported for use with a slate computer yet still provide increased functionality of dedicated hardware controls 116. In one or more implementations, the control portions 112, 114 may be removably secured to the computing device 102. For example, the computing device 102 and/or the control portions 112, 114 may include magnets such that when the control portions 112, 114 are "flipped" onto the front of the computing device, these portions "snap" onto the device. This may promote an improved look and feel when interacting with these portions.

FIG. 4 depicts an example of a top view 400 of the computing device 102 and input device when assuming the configuration as shown in FIG. 1. As shown, the input portion 304 is positioned at a rear of the computing device 102. The control portions 112, 114 are then rotated around the sides of the computing device 102 to coincide with the display device 110. In this way, controls included on the control portions 114, 112 may also be viewed and interacted with when in this configuration.

Further, rear controls 402 may also be made assessable by the input device 104. This may include use of dedicated controls to provide operations such as triggers that are found on game controllers. In another example, keys of the input portion 304 may be repurposed. For instance, one or more the keys of the QWERTY keyboard may be accessed by fingers of the user's hands 106, 108 when grasping the input device 104. Thus, in one or more implementations a portion of the keys of the input portion 304 may be disabled when in this configuration (e.g., keys located in a center of the input portion 304 such as letter keys) with another portion of the keys used to support interaction when grasping and supporting the input device 104, e.g., shift, backspace, tab, and so on, such as when in a game mode as described above.

Figure 5:
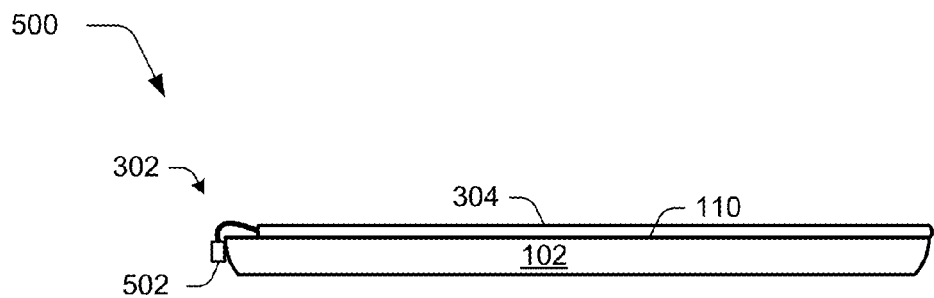
FIG. 5 depicts a side view in an example implementation in which the input device is configured as a protective case for use with the computing device.

FIG. 5 depicts a side view 500 of the input device 104 of FIG. 3 as covering a display device 110 of the computing device 102. In this example, the input portion 304 is rotated to substantially cover the display device 110 of the computing device 102. This may be performed in a variety of ways, such as through use of the flexible hinge 302 and a connection portion 502 that is configured to removably connect the input device 104 to the computing device 102, e.g., through magnetism. The control portions 112, 114 may be positioned in a variety of ways to support this arrange.

Figure 6:
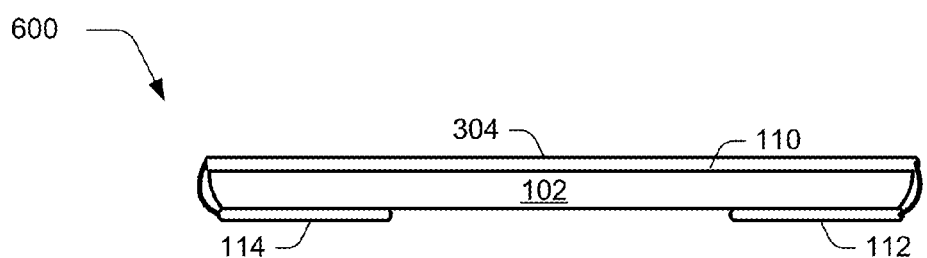
FIG. 6 depicts a top view in an example implementation in which the input device is configured as a protective case for use with the computing device.

FIG. 6, for instance, depicts an example of top view 600 of the input device 104 of FIG. 5 in which the control portions 112, 114 are positioned at a rear of the computing device 102. Like FIG. 4, the control portions 112, 114 may be rotated around the sides of the computing device 102. In this example, however, the control portions 112, 114 are positioned at a rear of the computing device 102. Further, the control portions 112, 114 may also be secured in this configuration, such as through use of magnets or other retention devices.

Figure 7:
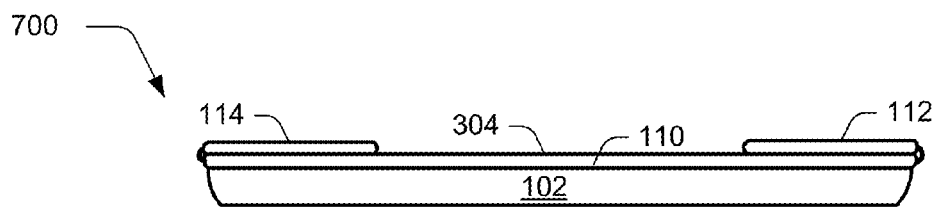
FIG. 7 depicts another top view in an example implementation in which the input device is configured as a protective case for use with the computing device.

FIG. 7 depicts another instance of a top view 700 of the input device 104 of FIG. 5. In this example, the control portions 112, 114 are positioned over the input portion 304 when covering the display device 110. Accordingly, the input portion 304 covers the display device 110 and the control portions 112, 114 are positioned such that the input portion 304 is located between the display device 110 and the control portions 112, 114. A variety of other examples are also contemplated without departing from the spirit and scope thereof.

Figure 8:
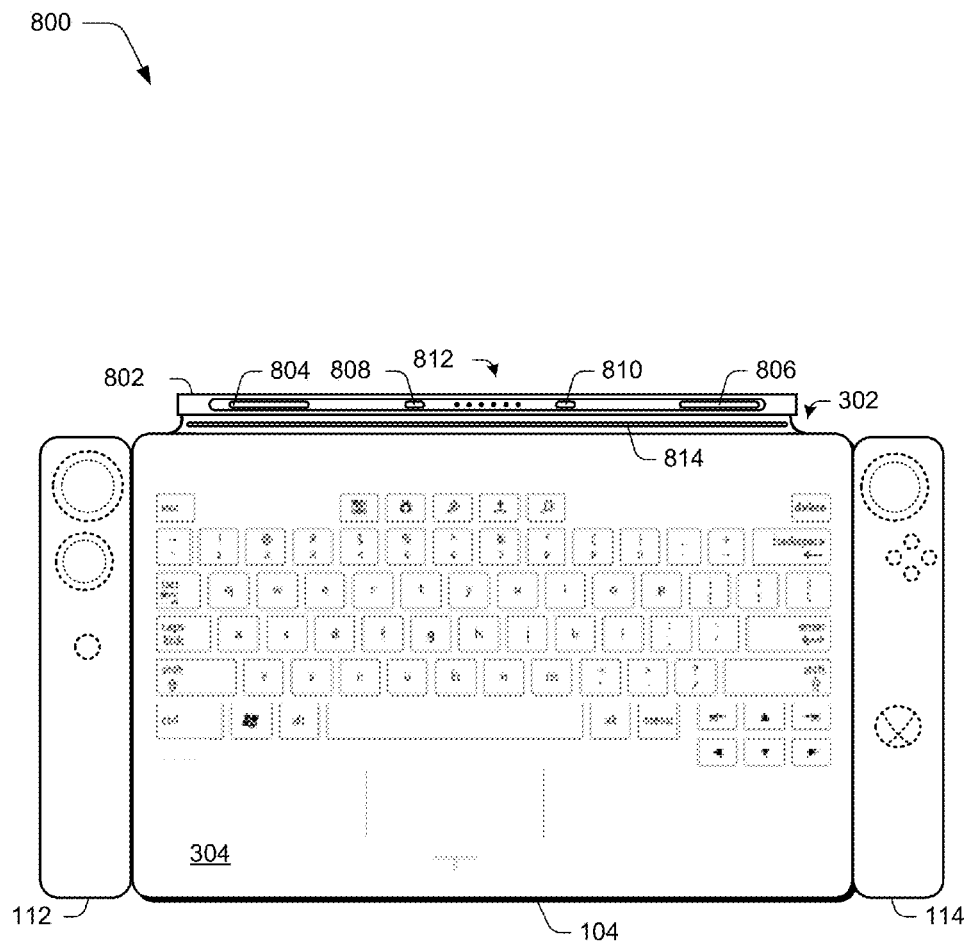
FIG. 8 depicts an example implementation of the input device of FIG. 3 as showing the flexible hinge in greater detail.

FIG. 8 depicts an example implementation 800 of the input device 104 of FIG. 3 as showing the flexible hinge 302 in greater detail. In this example, a connection portion 802 of the input device 104 is shown that is configured to provide a communicative and physical connection between the input device 104 and the computing device 102. The connection portion 802 as illustrated has a height and cross section configured to be received in a channel in the housing of the computing device 102, although this arrangement may also be reversed without departing from the spirit and scope thereof.

The connection portion 802 is flexibly connected to the input portion 304 of the input device 104 that includes the keys through use of the flexible hinge 302. Thus, when the connection portion 802 is physically connected to the computing device the combination of the connection portion 802 and the flexible hinge 302 supports movement of the input device 104 in relation to the computing device 102 that is similar to a hinge of a book.

Through this rotational movement, a variety of different orientations of the input device 104 in relation to the computing device 102 may be supported as previously describe. For example, rotational movement may be supported by the flexible hinge 106 such that the input device 104 may be placed against the display device 110 of the computing device 102 and thereby act as a cover as shown in the example orientation of FIG. 5. Thus, the input device 104 may act to protect the display device 110 of the computing device 102 from harm.

As shown in the example orientation of FIG. 3, a typing arrangement may be supported. In this orientation, the input device 104 is laid flat against a surface and the computing device 102 is disposed at an angle to permit viewing of the display device 110, e.g., such as through use of a kickstand disposed on a rear surface of the computing device 102.

In the example orientation of FIG. 4, the input device 104 may also be rotated so as to be disposed against a back of the computing device 102, e.g., against a rear housing of the computing device 102 that is disposed opposite the display device 110 on the computing device 102. In this example, through orientation of the connection portion 802 to the computing device 102, the flexible hinge 106 is caused to "wrap around" the connection portion 202 to position the input device 104 at the rear of the computing device 102. Thus, in this orientation the user may access touchscreen functionality of the display device 110 from a front of the device and keys of the input device 104 from a rear of the device.

Naturally, a variety of other orientations are also supported. For instance, the computing device 102 and input device 104 may assume an arrangement such that both are laid flat against a surface as shown in FIG. 1. Other instances are also contemplated, such as a tripod arrangement, meeting arrangement, presentation arrangement, and so forth.

Returning again to FIG. 8, the connection portion 802 is illustrated in this example as including magnetic coupling devices 804, 806, mechanical coupling protrusions 808, 810, and a plurality of communication contacts 812. The magnetic coupling devices 804, 806 are configured to magnetically couple to complementary magnetic coupling devices of the computing device 102 through use of one or more magnets. In this way, the input device 104 may be physically secured to the computing device 102 through use of magnetic attraction. The connection portion 802 also includes mechanical coupling protrusions 808, 810 to form a mechanical physical connection between the input device 104 and the computing device 102.

The mechanical coupling protrusions 808, 810 are configured to be received within complimentary cavities within a channel of the computing device 102. When so received, the mechanical coupling protrusions 808, 810 promote a mechanical binding between the devices when forces are applied that are not aligned with an axis that is defined as correspond to the height of the protrusions and the depth of the cavity.

The connection portion 802 is also illustrated as including a plurality of communication contacts 812. The plurality of communication contacts 812 is configured to contact corresponding communication contacts of the computing device 102 to form a communicative coupling between the devices. Although a physical communicative coupling is illustrated, wireless implementations are also contemplated without departing from the spirit and scope thereof. The input device 104, for instance, may include a battery and wireless communication system to support wireless communication between the devices. In the previous examples, the input device 104 is illustrated as configured for use with a game. Other implementations are also contemplated, an example of which is described and follows and shown in a corresponding figure.

Figure 9:
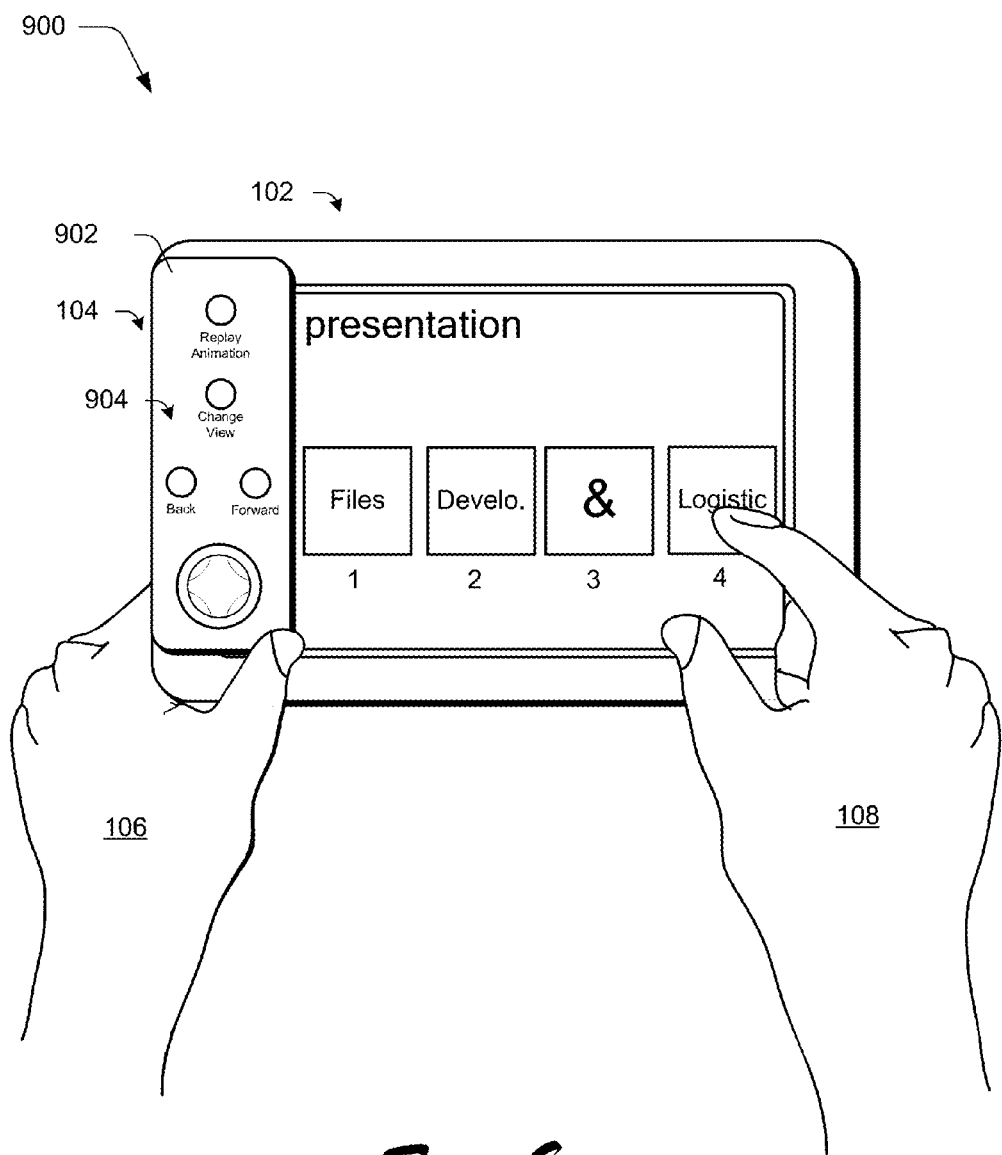
FIG. 9 depicts a system in an example implementation in which another configuration of the input device is shown.

FIG. 9 depicts a system 900 in an example implementation in which another configuration of the input device 104 is shown. In this example, the input device 104 is also communicatively coupled to the computing device 102 and configured to act as a cover similar to the input device 104 of FIG. 3.

In this example, however, a single control portion 902 is configured to extend around a side of the computing device 102. The control portion 902 includes controls that are configured for use in navigating through a presentation. As such, the computing device 102 may display sides involved in the presentation in a user interface which may be selected using one or more fingers of the user's hand 108. Additionally, the controls 904 may be operated with a thumb of the user's other hand 106. A variety of other configurations and controls are also contemplated, such as to include controls configured for use in a browser to surf the Internet, controls configured to support interaction with a social network, and so forth.

Example Procedures

The following discussion describes input device techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

FIG. 10 depicts a procedure 1000 in an example implementation in which the input device assumes different positions relative to a computing device. An input device is rotated to assume a first position in relation to a computing device, the input device removably connected to the computing device using magnetism, the first position causing a protection portion of the input device to substantially cover a display device of the computing device (block 1002). As shown in FIGS. 5, 6, and 7, for instance, the input portion 304 may act as a protection portion to protect the display device 110. As should be readily apparent, this may also be performed with a "plain" protection portion that does not include keys.

The input device is also rotated to assume a second position in relation to the computing device, the second position causing the protection portion to be disposed at a rear of a housing of the computing device that is opposite to the display device and exposure of at least one control that is configured to provide one or more inputs to the computing device (block 1004). As shown in FIGS. 1 and 4, for instance, the input portion 304 may be disposed at a rear of the computing device 102 yet still remain physically and communicatively coupled to the computing device 102. Control portions 112, 114 may then be used to expose controls 116 with which interaction may be performed using the thumbs of the user's hands 106, 108. A variety of other examples are also contemplated.

Example System and Device

Figure 11:
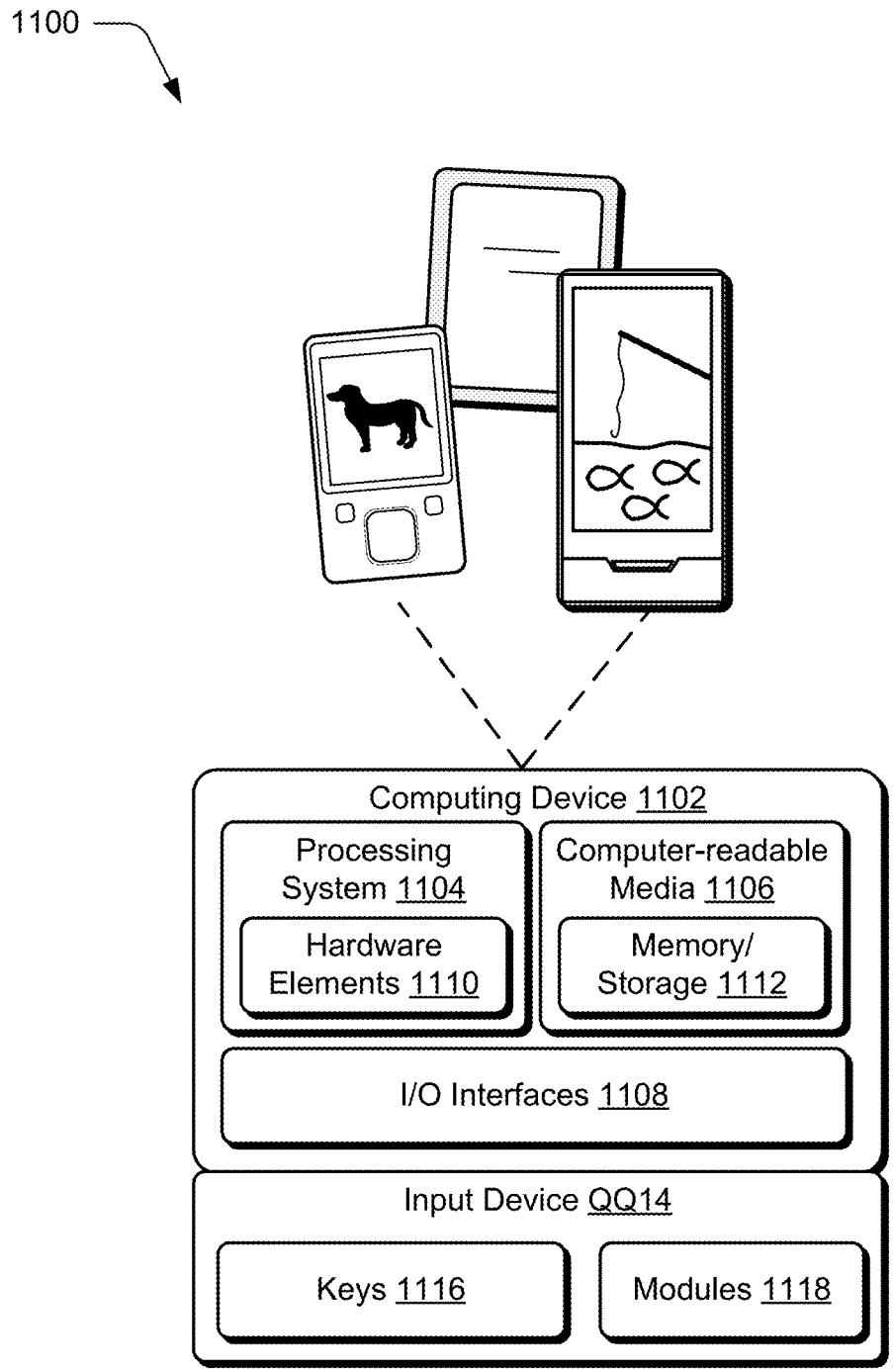
FIG. 11 illustrates an example system including various components of an example device that can be implemented as any type of computing device as described with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. The computing device 1102 may be, for example, be configured to assume a hand held configuration through use of a housing formed and size to be grasped and carried by one or more hands of a user, illustrated examples of which include a mobile phone, mobile game and media device, and tablet computer although other examples are also contemplated.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways to support user interaction.

The computing device 1102 is further illustrated as being communicatively and physically coupled to an input device 1114 that is physically and communicatively removable from the computing device 1102. In this way, a variety of different input devices may be coupled to the computing device 1102 having a wide variety of configurations to support a wide variety of functionality. In this example, the input device 1114 includes one or more keys 1116, which may be configured as pressure sensitive keys, mechanically switched keys, and so forth.

The input device 1114 is further illustrated as include one or more modules 1118 that may be configured to support a variety of functionality. The one or more modules 1118, for instance, may be configured to process analog and/or digital signals received from the keys 1116 to determine whether a keystroke was intended, determine whether an input is indicative of resting pressure, support authentication of the input device 1114 for operation with the computing device 1102, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
  a protective case configured to at least partially encompass a housing of a computing device such that a rear portion of the housing is substantially covered by the protective case while a display device of the computing device is viewable, the protective case physically coupled to the computing device via a flexible hinge; and
  one or more controls disposed on and integrated with a surface of the protective case and configured to provide one or more inputs to the computing device, at least one said control:
    positioned to be accessible by a thumb of a user's hand when holding the protective case having the computing device disposed therein such that the rear portion of the housing is substantially covered by the protective case while the at least one said control is accessible by the thumb of the user's hand; and
    positioned on a side of the protective case that corresponds to the display device of the computing device.

2. An apparatus as described in claim 1, wherein the protective case is configured to be removably attached to the computing device.

3. An apparatus as described in claim 2, wherein the protective case is removably attached to the computing device using magnetism.

4. An apparatus as described in claim 1, wherein the protective case is movable between first and second positions in which the first position causes the protective case to substantially cover the display device of the computing device and a second position in which the protective case is positioned at a rear of the housing of the computing device.

5. An apparatus as described in claim 1, wherein the protective case is moveable via rotational movement in relation to the computing device that mimics a cover of a book along a first axis and restricts movement of the input device in relation to the computing device along a second axis that is substantially perpendicular to the first axis.

6. An apparatus as described in claim 1, wherein the protective case further comprises an input portion having a plurality of keys and one or more control portions that include the at least one said control.

7. An apparatus as described in claim 6, wherein protective case is configured such that the plurality of keys are not accessible to a user when the at least one control is accessible to the user.

8. An apparatus as described in claim 6, wherein another said control is disposed on a side of the input portion that is opposite to a side of the input portion that includes the plurality of keys.

9. An apparatus as described in claim 6, wherein the one or more control portions are rotatable in relation to the input portion.

10. An apparatus as described in claim 1, wherein the at least one said control is a dedicated for use in playing a game that is displayable on the display device.

11. An apparatus as described in claim 1, wherein the at least one said control is included as part of a control portion that is configured to be positioned on the side of the protective case that corresponds to a display device of the computing device, the positioning causes the computing device to enter a game mode.

12. An apparatus as described in claim 1, wherein the one or more inputs to the computing device are communicated through the flexible hinge.

13. An input device comprising:
a connection portion comprising a flexible hinge configured to provide a removable physical connection to a computing device;
a protective case coupled to the connection portion and configured to support rotational movement of the protective case in relation to the computing device when the connection portion is physically connected to the computing device such that a rear portion of the computing device is substantially covered by the protective case while a display device of the computing device is viewable; and
one or more controls disposed on and integrated into the protective case such that at least one said control is accessible to a user as positioned on a side of the protective case that corresponds to the display device of the computing device when the protective case is positioned behind the computing device substantially covering the rear portion of the computing device and the computing device and the input device are grasped by one or more hands of a user.

14. An input device as described in claim 13, wherein the at least one said control is disposed on the protective case such that the at least one said control and the display device of the computing device are viewable by a user when grasped by the one or more hands of the user.

15. An input device as described in claim 13, wherein the connection portion is configured to support the removable physical connection to the computing device using magnetism.

16. An input device as described in claim 13, wherein the one or more controls are disposed on a control portion that is rotatable with respective a protection portion of the protective case, the protection portion being rotatable with respect to the connection portion.

17. An input device as described in claim 13, wherein the one or more controls provide communication to the computing device via the flexible hinge.

18. A method comprising:
rotating an input device to assume a first position in relation to a computing device, the input device removably connected to the computing device using magnetism, the first position causing a protection portion of the input device to substantially cover a display device of the computing device; and
rotating the input device to assume a second position in relation to the computing device, the second position causing:
the protection portion to be disposed at a rear of a housing of the computing device that is opposite to the display device;
exposure of at least one control that is configured to provide one or more inputs to the computing device as positioned on a side of the protective case that corresponds to the display device of the computing device; and
the rear of the housing to be substantially covered by the protection portion while still allowing both the display device of the computing device and the at least one control to be viewable.

19. A method as described in claim 18, wherein the second position causes both the display device and the at least one control to be viewable simultaneously when a user grasps the computing device and the input device.

20. A method as described in claim 18, wherein rotating the input device is performed through a flexible hinge.

* * * * *